Patented Sept. 6, 1927.

1,641,182

UNITED STATES PATENT OFFICE.

CHARLES HENRI MARSCHALK, OF PARIS, FRANCE.

BLACK SULPHURIZED NAPHTHOL DYES.

No Drawing. Application filed March 11, 1924, Serial No. 698,568, and in France March 16, 1923.

The invention resides in the fact that when heating at a high temperature with alkaline polysulphides, the condensation products obtained by the reaction of anhydrous chlorides, such as aluminium, ferric or other chlorides, on mono or polyhydroxyl derivatives containing preferably naphthalene nuclei (betanaphthol, dihydroxynaphthalene 2—7, betadinaphthol, etc.) black dyestuffs are obtained which act as vatting dyestuffs and possess a fair resistance against soap washing and chlorine.

The naphthalene mono- or poly-hydroxyl derivatives referred to herein have the general formula:

$$R(OH)_n,$$

where R is a radical which may be composed of one or more naphthalene nuclei, and $n$ is any integer. An example of such a mono-naphthalene compound is betanaphthol, and of a poly-naphthalene compound is betadinaphthol.

The following are examples of putting the invention into practice; obviously the amounts of reacting agents set forth in these examples are not absolute but may vary within fairly wide limits.

*Example 1.*—A black dyestuff from betanaphthol: One part of betanaphthol thoroughly mixed with three parts of pulverized anhydrous aluminium chloride is heated for one hour at 220° C. (the temperature being taken within the mass).

This mixture is pulverized, then treated with acid water and finally washed. The mixture is furthermore washed with dilute soda solution which has almost no solvent action.

The residue is brown-black. It is insoluble in alkalies. It is then melted with a polysulphide, e. g. in the following manner:

5 parts of the brown-black residue are mixed with a melted mixture of 5 parts of crystallized sodium sulphide, 10 parts of sulphur and three parts of water, heated to 250° C. The temperature is progressively raised up to 305–310° C. and kept so for approximately one hour.

The mass thus obtained is afterward ground, thoroughly washed with water and then dried. A black compound is obtained containing an excess of sulphur which is sublimed off by heating at 250° C.

The compound dissolves in an alkaline hydrosulphite. The vat liquor is brown-black. Cotton is dyed black.

*Example 2.*—A black dyestuff from dihydroxynaphthalene (2—7). One part of dihydroxynaphthalene (2—7) thoroughly mixed with 4 parts of anhydrous aluminium chloride, is heated at 220° C. for one hour.

The swollen mass thus obtained is decomposed by means of diluted hydrochloric acid and thoroughly washed with dilute caustic soda solution in order to eliminate the unattacked dihydroxynaphthalene.

The remainder, insoluble in soda, is melted with: 1 part of crystallized sodium sulphide, 2 parts of sulphur, ½ part of water, and the mass is heated for approximately half an hour at a temperature of 305–310° C.

The obtained mass is afterwards washed with water, dried, and heated by any known means in order to eliminate the sulphur in excess.

The resultant compound dissolves in an alkaline hydrosulphite producing a brown-black vat liquor which dyes cotton in black tints.

*Example 3.*—A black dyestuff from betadinaphthol—

It is known that betadinaphthol is easily obtained with a nearly quantitative yield by adding ground betanaphthol to a diluted and hot solution of ferric chloride.

When a thorough mixture of anhydrous pulverized aluminium chloride and of very dry betadinaphthol is heated, the temperature and the time of reaction being such that the mass no longer contains dihydroxyperylene 1—12 or corresponding perylenequinone, a compound is obtained which, when heated afterwards with sulphur and sodium sulphide, produces a black dyestuff acting as a vatting dyestuff.

This dyestuff differs from that described in French Letters Patent No. 564,794, filed on January 6th, 1923, in that it gives a blackish vat liquor not having a violet tinge and does not dissolve in hot concentrated sulphuric acid; while the dyestuff derived from dihydroxyperylene and described in the aforesaid patent gives a violet-tinged vat liquor, and a blue-violet solution in hot concentrated sulphuric acid.

In order to obtain this black dyestuff from betadinaphthol, one part of betadinaphthol is thoroughly mixed with three parts of finely pulverized anhydrous aluminium chloride and is heated at a temperature (taken within the mass) of approximately 180°–220° C. up to the time when a test specimen taken from the mass shows that the dihydroxyperylene (1—12) and the corresponding perylenequinone (1—12) have completely disappeared.

This disappearance is shown by the absence of any solution in hot acetic acid, in alkaline sodium hydrosulphite and even in dilute caustic soda solution to which the aluminium scraps are added. Dihydroxyperylene (1—12) and the corresponding perylenequinone dissolve in alkaline sodium hydrosulphite and dihydroxyperylene dissolves in hot acetic acid (Mon. fur Chem. 43 Bd. 3 Heft pages 125 and 127).

The compound thus obtained is then pulverized, washed with water and afterwards with diluted hydrochloric acid, washed again, and then melted with sulphur and sodium sulphide, for example with one part of crystallized sodium sulphide, two parts of flour of sulphur and one half part of water. The mixture is melted and when a temperature of 250° C. is reached, one part of the previous intermediate compound is admixed thereto.

The mixture thus completed is then heated during approximately half an hour up to 305–310° C. (the temperature being taken in the metallic heating bath).

The molten mass is ground and heated with hot water, then filtered, washed, and the sulphur in excess is eliminated by any convenient known means, for example by heating at 250° C., in order that the sulphur be sublimed off.

What I claim is:

1. Black vatting dyestuff, obtained by the action of an alkaline polysulphide on a condensation compound obtained by the reaction of an anhydrous chloride which is a reducing agent upon an hydroxy-naphthalene derivative.

2. Black dyestuff acting as a vatting dyestuff, obtained by the action of an alkaline polysulphide on a condensation compound obtained by the reaction of an anhydrous chloride which is a reducing agent upon betadinaphthol.

3. Black dyestuff acting as a vatting dyestuff, obtained by the action of an alkaline polysulphide on a condensation compound obtained by the reaction of anhydrous aluminium chloride upon an hydroxy-naphthalene derivative.

4. A process for the manufacture of dyestuffs, which consists in effecting a reaction between an anhydrous chloride which is a reducing agent and a hydroxy-naphthalene derivative, and thereafter treating the resultant product with an alkaline polysulphide.

5. A process for the manufacture of a dyestuff which consists in effecting a reaction between an anhydrous chloride which is a reducing agent and a hydroxy-derivative of a betahydroxynaphthalene, and thereafter treating the resultant product with an alkaline polysulphide.

6. A process for the manufacture of a dyestuff which consists in effecting a reaction between aluminum chloride and a naphthalene derivative and thereafter treating the resultant product with an alkaline polysulphide.

7. A process for the manufacture of a dyestuff which consists in heating betadinaphthol with anhydrous aluminum chloride up to 180° C.–220° C. and for such a time that dihydroxyperylene (1—12) and the corresponding perylene quinone disappear, washing the obtained mass, and melting the said mass with sulfur and sodium sulphide.

In testimony whereof I affix my signature.

CHARLES HENRI MARSCHALK.